United States Patent [19]

Prenat

[11] Patent Number: 4,924,231
[45] Date of Patent: May 8, 1990

[54] DEVICE FOR REMOVING THE AMBIGUITY OVER RANGE AND SPEED, USED MORE ESPECIALLY IN COMBINATION WITH A DOPPLER TYPE RADAR RECEIVER AND A RADAR CONTAINING IT

[75] Inventor: Michel Prenat, Paris, France

[73] Assignee: Thomson-CSF, Paris, France

[21] Appl. No.: 267,639

[22] Filed: Oct. 31, 1988

Related U.S. Application Data

[63] Continuation of Ser. No. 787,707, Oct. 16, 1985, abandoned, which is a continuation of Ser. No. 589,036, Mar. 13, 1984, abandoned, which is a continuation of Ser. No. 296,976, Aug. 26, 1981, abandoned, which is a continuation of Ser. No. 132,663, Apr. 1, 1980, abandoned.

[30] Foreign Application Priority Data

Jun. 15, 1979 [FR] France ................. 79 15450

[51] Int. Cl.⁵ ............. G01S 13/42; G01S 13/54
[52] U.S. Cl. ........................... 342/137; 342/163
[58] Field of Search ........... 342/109, 111, 137, 163

[56] References Cited

U.S. PATENT DOCUMENTS 4,057,800 11/1977 Ganz ..................... 342/116

Primary Examiner—Thomas H. Tarcza
Assistant Examiner—Gilberto Barrón, Jr.
Attorney, Agent, or Firm—Pollock, VandeSande & Priddy

[57] ABSTRACT

A device for removing ambiguities in the range and speed at the output of a Doppler-type radar in which all possible sets $(p_1, q_1)$ and $(p_2, q_2)$ corresponding to echoes at different repetition frequencies are stored in a first memory, $p_1$ and $p_2$ representing the number of the range quantum from which an echo signal is received and $q_1$ and $q_2$ the number of the filter at the output of which an echo signal is maximum. Pairs of signals are supplied in response to a first clock signal together with radar data in a second memory to two calculating circuits which carry out tests to determine of $p_1$ and $p_2$ and $q_1$ and $q_2$ respectively come from the same target and calculate the true target distance and true Doppler frequency. If both tests are positive the true distance and frequency are stored in a memory. If either is negative the first clock signal is produced to supply a new pair to the respective calculating circuits.

11 Claims, 2 Drawing Sheets

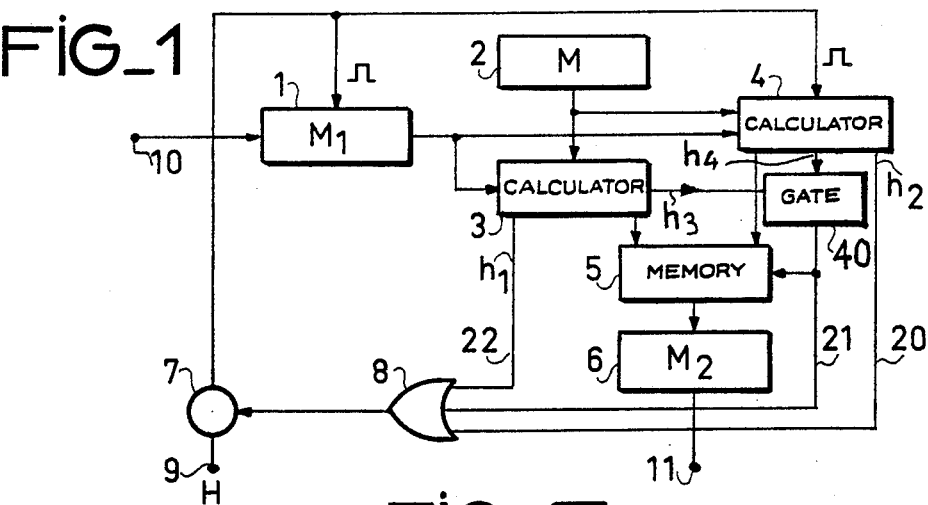
FIG_1
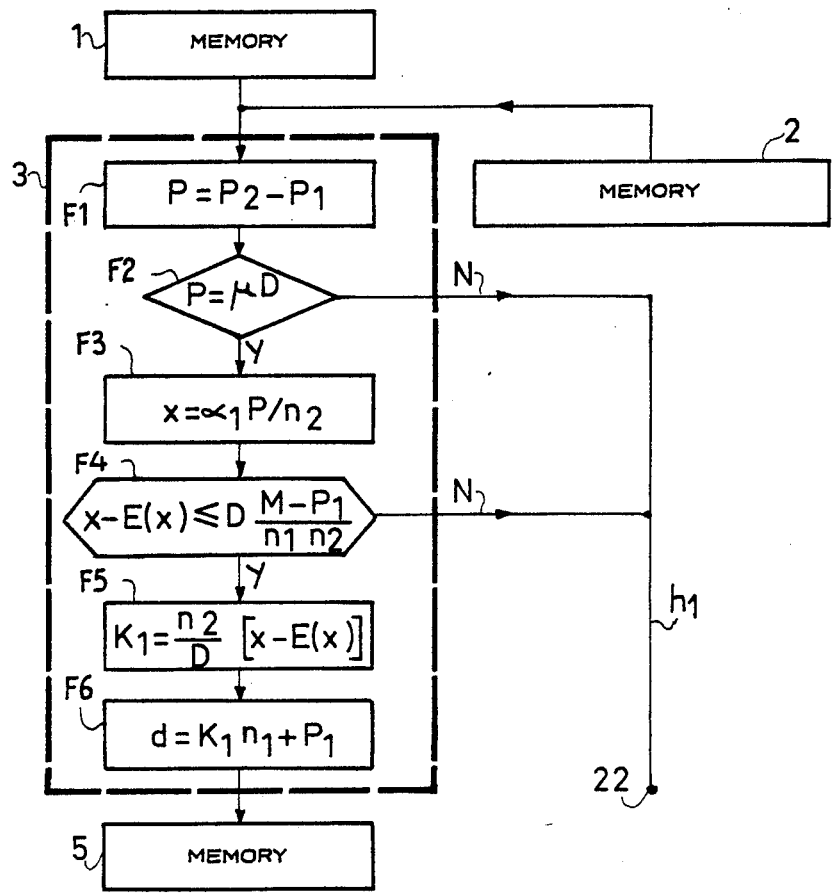
FIG_2

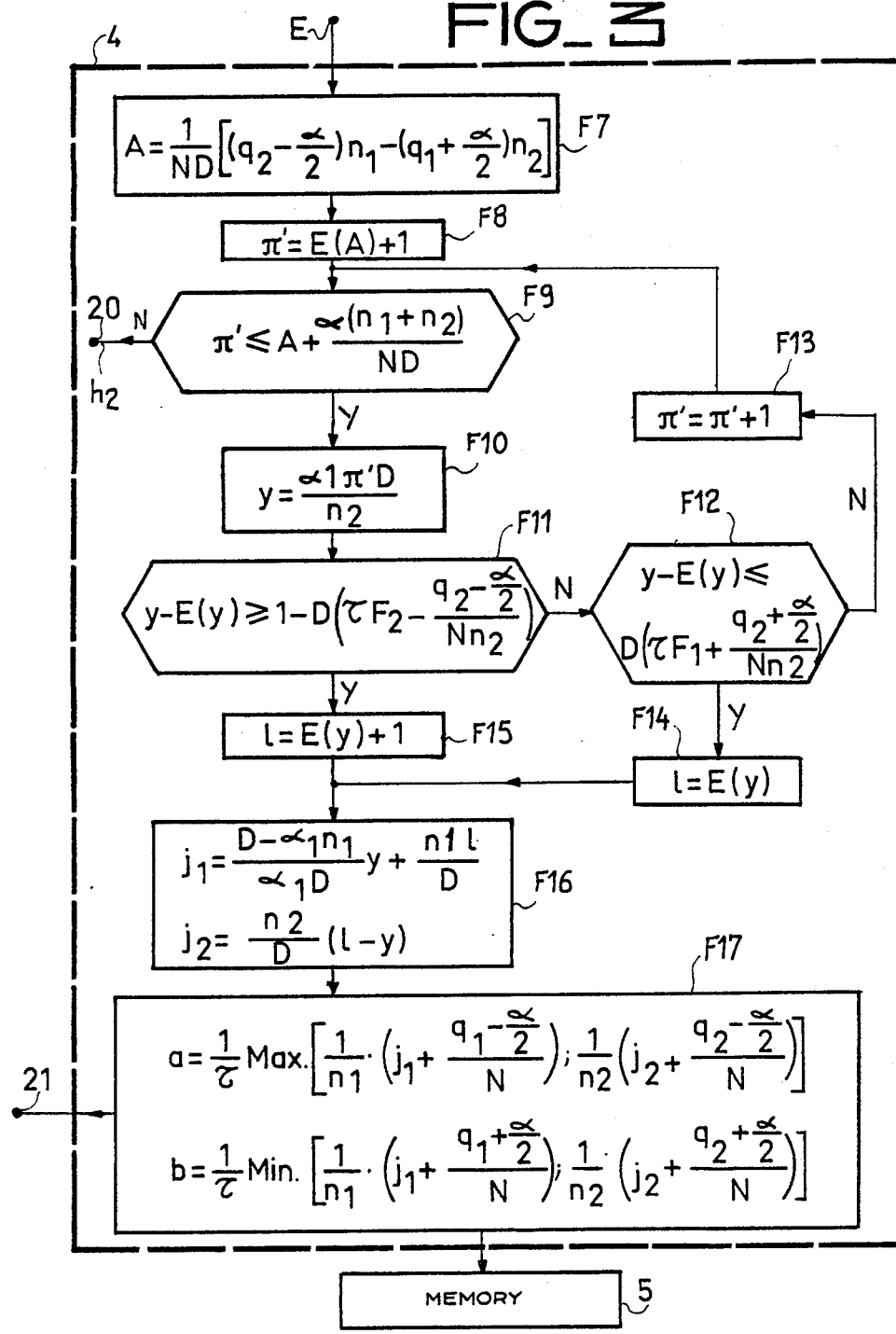
FIG_3

DEVICE FOR REMOVING THE AMBIGUITY OVER RANGE AND SPEED, USED MORE ESPECIALLY IN COMBINATION WITH A DOPPLER TYPE RADAR RECEIVER AND A RADAR CONTAINING IT

This is a continuation of co-pending application Ser. No. 787,707 filed on Oct. 16, 1985, (now abandoned) which was a continuation of application Ser. No. 589,036 filed on 3/13/84 (now abandoned) which was continuation of application Ser. No. 296,976 filed Aug. 26, 1981 (now abandoned) which was a continuation of application Ser. No. 132,663 filed Apr. 1, 1980 (now abandoned).

BACKGROUND OF THE INVENTION

The invention relates to a method and a device for removing the ambiguity over range and speed, used more especially in a Doppler radar transmitting pulses at several repetition frequencies.

Present Doppler radars transmit pulses with repetition frequencies relatively close one to another. The use of several repetition frequencies is justified by the fact that a single repetition frequency introduces ambiguity over the range and speed. On the one hand the repetition period determines the maximum range D' without ambiguity, $D'=CT/2$, where C is the speed of light, and, on the other, the true Doppler frequency $F_D$ is measured with an error equal to a multiple of the repetition frequency, $F_D = f_D + k \cdot f_R$, where $f_D$ is the Doppler frequency, $f_R = 1/T$ the repetition frequency being considered and k a whole number.

In general, the range ambiguity is eliminated by the use of a repetition frequency sufficiently low for the range D' to be at least equal to the maximum range $D_o$ of the radar.

To remove the ambiguity over the Doppler frequency, several repetition frequencies are used sufficiently close one to another for the ambiguity numbers of the same target to differ by 1 at the most; for all other values the ambiguity remains.

Thus through this restriction at close repetition frequencies one cannot use the advantages due to repetition frequencies distant one from another as, for example, the rejection of ground echoes due to the antenna main lobe.

SUMMARY OF THE INVENTION

The object of the device according to the invention is to overcome these disadvantages by the use of two repetition frequencies, which are picked at will in a field limited by the conditions resulting from the operating characteristics of the radar containing it, which also enables the ambiguities over range and Doppler frequency to be completely removed also. In accordance with one characteristic of the invention, the device contains a memory which receives two pairs of signals $(p_1, q_1)$ and $(p_2, q_2)$ corresponding to two echo signals for two different repetition frequencies $f_{r1}$ and $f_{r2}$, where $p_1$ or $p_2$ represents, with respect to the latest transmitted pulse, the number of the range quantum in which the echo signal is and $q_1$ or $q_2$ represents the number of the frequency filter at the output of which an echo signal is at a maximum. This memory, like another containing the numbers defining the characteristics of the Doppler radar, is connected to two calculation circuits. The first one calculates the true range and the second one the true Doppler frequency if the two echoes come from the same target, the results being transmitted to a memory.

In accordance with another characteristic of the invention, the device contains a logic circuit which enables the values of the true range and true Doppler frequency, obtained from validation signals coming from calculation circuits, to be transferred to a second memory.

In accordance with another characteristic of the invention, the device contains a time circuit which enables sets of values $p_1$, $q_1$, $p_2$, $q_2$ associated with a pair of echoes in the calculation circuits to be transferred in succession, this time circuit containing a switch controlled by a logic circuit which receives signals from the calculation circuits corresponding either to the end of the calculation or to a negative result of an intermediate test made by the calculation circuits.

BRIEF DESCRIPTION OF THE DRAWINGS

Other advantages and characteristics of the present invention will appear in the description which follows together with the figures which represent:

in FIG. 1, the general schematic diagram of the device in accordance with the invention, in FIG. 2, the detailed flowchart of the calculations made by the circuit removing the ambiguity over the range, in FIG. 3, the detailed flowchart of the calculations made by the circuit removing the ambiguity over the Doppler frequency.

DESCRIPTION OF AN EMBODIMENT OF THE INVENTION

The operation of a Doppler radar is known and will only be repeated briefly here.

A transmitter circuit sends pulses at different repetition frequencies in the same direction of aim of the antenna. A receiver circuit, between the transmitted pulses, receives the echo signals coming from fixed or moving targets which are in the direction of aim of the antenna. These echo signals are filtered so as to eliminate those due to fixed targets and are then applied to a bank of frequency filters. Hence, an echo signal will only come from the frequency filter corresponding to its associated ambiguous Doppler frequency. Because of the ambiguity in the measurement of the Doppler frequency, the tuned frequencies of these filters are all less than the repetition frequency of the transmitted pulses. In the following description, it will be assumed that there are N frequency filters, the tuned frequency of each one of them being marked by its number, which is between 1 and N and will be called $q_i$ for a repetition frequency of $f_{ri}$. As these filters have a certain passband, the frequency of a signal appearing in the filter number $q_i$ will be defined to $\pm(\alpha/2)(f_{ri}/N)$, where $\alpha$ is a number greater than 1.

If the repetition frequency of the transmitted pulses is sufficiently high to cause range ambiguity, the position in time of the echo signal will be marked with respect to the pulse transmitted immediately before this echo is received.

The reception time between two transmitted pulses is divided into intervals of an elementary length $\tau$, each interval corresponding to a range interval called a range quantum. The repetition frequencies are such that $f_{ri} = 1/\tau n_i$ in which $n_i$ is an integer so that the number of range quanta between two transmitted pulses is an integer and the length of one of the transmitted pulses is in general $\tau$. For each repetition frequency $f_{ri}$, the order of the range quantum where the echo signal is with respect to the latest transmitted pulse will be called pi. The repetition frequency $f_{ri}$ may be written: $f_{ri} = 1/n_{i\tau}$. The integer $n_i$ will be used in the description to represent the repetition frequency, the lowest value of $n_i$ indicating the highest frequency. Also, the highest common divider of $n_1$ and $n_2$ will be given as D, $n_1$ and $n_2$ representing the repetition frequencies $f_{r1}$ and $f_{r2} \cdot \alpha_1$ and $\alpha_2$ are coefficients defined by $\alpha_1 n_1 + \alpha_2 n_2 = D$. $F_1$ and $F_2$ represent the Doppler frequency limits which are acceptable with respect to the centre frequency of the carrier wave and $\Delta F$ is the value $|F_1 - F_2|$.

The device in accordance with the invention removes the ambiguities over the measurements of range and Doppler frequency by the use of two different repetition frequencies for each direction of aim of the antenna.

Two conditions then limit the choice of repetition frequencies $f_{r1}$ and $f_{r2}$ and hence of the integers $n_1$ and $n_2$. It is necessary that two pairs of values $(p_1, q_1)$ and $(p_2, q_2)$ give only one value of true range and Doppler frequency. If this would not be the case, even a true target could appear as a double target. The least common multiple of $n_1$ and $n_2$ must be greater than or equal to $$M = \frac{2D_o}{C\tau}$$

where $D_o$ is the maximum range of the radar and, if $m'$ represents a positive integer less than $$\frac{n_1 + n_2}{ND},$$

the following must not hold $$L - D\left[\tau \cdot \Delta F - \frac{\alpha}{Nn_1}\right] \leq \frac{\alpha_2 m' D}{n_1} \leq L + D\left[\tau \cdot \Delta F - \frac{\alpha}{Nn_1}\right]$$

in which L is a relative integer. Although they limit the choice of repetition frequencies, these two conditions allow greater flexibility in adaptation to the operating conditions. An infinity of pairs of frequencies $f_{r1}$ and $f_{r2}$ very different from each other can satisfy these two conditions.

The device in accordance with the invention uses the values of two pairs of values $(p_i, q_i)$ coming from two echoes which, a priori, are considered as likely to come from the same target for the two different repetition frequencies chosen as a function of the preceding conditions. If $f_{r1}$ and $f_{r2}$ are these two repetition frequencies, the values used to remove the ambiguity are then $q_1$, $p_1$, $q_2$ and $p_2$.

FIG. 1 shows the general schematic diagram of the device in accordance with the invention. It contains a first memory 1 which receives two pairs of signals ($q_1$, $p_1$), ($q_2$, $p_2$), each of them coming from frequency filters at a repetition frequency $f_{r1}$ or $f_{r2}$, a second memory 2 in which the values of the constants $n_1$, $n_2$, $\tau$, D, $\alpha_1$, $\alpha_2$, $F_2$, $F_1$, $$M = \frac{2D_o}{C\tau}$$

are permanently stored in the form of binary words, a first circuit 3 calculating the real range at which the target is if the target is recognized as real, a second circuit 4 calculating the true Doppler frequency in this case, a third and fourth memory 5 and 6 which enable the values of the real range and Doppler frequencies corresponding to the echoes of moving-targets detected to be transferred, an "OR" logic circuit 8 which controls the output from the first memory 1 of a set of binary words corresponding to the values ($q_1$, $p_i$), ($q_2$, $p_2$) of two echoes and a gate circuit 40, of the "AND" logic type for example.

This circuit functions as follows:

The first memory 1 receives all the pairs of binary numbers corresponding to the quantities $p_i$, $q_i$ for a direction of aim of the antenna. A clock signal of frequency $f_h$ is applied to a terminal 9. The choice of this clock frequency $f_h$ is related to the full calculation time of the device and, in particular, to the calculation time of the first and second computers 3 and 4. This clock signal, derived from switch 7, which may be an "AND" logic circuit, is applied to the first memory 1 and to the second calculating circuit 4 eliminates the ambiguity over the Doppler frequency. If switch 7 is closed, a clock pulse triggers the second calculating circuit 4, which removes the ambiguity over the Doppler frequency, and controls the transfer of a pair of binary numbers ($p_q$, $q_1$) and ($p_2$, $q_2$) to the first and second calculating circuits 3 and 4, each of these pairs coming from a different repetition frequency. The first and second calculating circuits 3 and 4 also receive continuously the contents of the second memory 2, i.e. the binary numbers corresponding to the quantities $\alpha$, $\alpha_1$, $n_1$, $n_2$, D, $F_1$, $F_2$, M and $\tau$. These two calculating circuits 3 and 4 perform the tests shown on the flowcharts of FIGS. 2 and 3 to find out whether the two pairs of values ($p_1$, $q_1$) and ($p_2$, $q_2$) associated with two echoes at two different repetition frequencies, $f_{r1}$ and $f_{r2}$, come from the same target or not. If at least one calculating circuit 3 or 4 gives a negative test rsult, it delivers a pulse $h_1$ or $h_2$ respectively to a circuit 8, which may be an "OR" gate for example. This circuit 8 then delivers at its output a pulse which closes the switch 7 and causes the transfer of the two following pairs of values $p_1$, $q_1$ and $p_2$, $q_2$. If the calculating circuits 3 and 4 give positive test results, they respectively calculate the range d and the true Doppler frequency FD associated with this echo. These values are applied to the input of a third memory 5. Furthermore each one of the calculating circuit 3, 4 delivers a pulse $h_3$ or $h_4$, which, through a circuit 40, that may be an "AND" logic circuit for example, validate the results of the buffer memory 5 by transferring them to a fourth memory 6 on the one hand and causes through the circuit 8 the switch 7 to close and the processing of the next two pairs of values on the other hand. The contents of the fourth memory 6 is available on a terminal 11. Thus all the combinations of two pairs ($p_i$, $q_i$) and ($p_j$, $q_j$) such that ($p_i$, $q_i$) come from repetition frequency $f_{r1}$ and ($p_j$, $q_j$) from repetition frequency $f_{r2}$ are tested.

The two calculating circuits 3 and 4, processing two signal pairs $p_i$, $q_i$ in order to determine whether they come from the same target. If the signal pairs come from the same target the calculating circuits 3 and 4 operate to determine the range and the true Doppler frequency of the target. The calculating circuits 3 and 4 may comprise microprocessors for example, which do the necessary calculations.

FIGS. 2 and 3 show respectively the detailed steps of the calculations done by both circuits 3 and 4.

For the calculations of circuit 3, which are shown in FIG. 2, the signal corresponding to a negative test, marked N, is applied to a terminal 22, which is connected to the circuit 8 controlling the switch 7 and represents the signal $h_1$ of FIG. 1. For the first of these tests, the number $\mu$ is an integer and hence the test consists in finding out whether the number p is divisible by D. The true range calculated, d, is given by:

$$d = p_1 + n_1 \frac{n_2}{D} \left[ \alpha_1 \left( \frac{p_2 - p_1}{n_2} \right) - E \left( \frac{\alpha_1 (p_2 - p_1)}{n_2} \right) \right]$$

in which E(x) represents the integral part of x.

The processing effected by the calculating circuit 3 is shown in detail in FIG. 2 as including steps F1–F6. The first step, F1, determines the quantity p as a difference between $p_2$ and $p_1$; each of the input quantities are derived from the memory $M_1$. Function F2 determines if there is an integer $\mu$ which is the ratio of p (calculated in the step F1) and D (the latter an input parameter from the memory 2). This is a first test to determine if the signal pairs $p_1$, $q_1$ and $p_2$ and $q_2$ come from the same target or different targets. If there is no such integer $\mu$, then calculating circuit 3 determines that the signal pairs come from different targets, and the signal $h_1$ is asserted to reject the signal pair and begin processing another signal pair.

On the other hand, if there is such an integer $\mu$, then processing continues with step F3. In step F3 the quantity x is calculated by the relationship shown in FIG. 2; the input parameters $\alpha_1$, p and $n_2$ are input from the memory 2 or have been previously calculated.

Function F4 determines whether the inequality shown in FIG. 2 holds. The left hand portion of the inequality is the difference between the quantity x (calculated in step F3) and the integer portion thereof, e.g. the left side of the inequality is the fractional portion of the quantity x. This is another test to determine if the signal pairs $p_1$, $q_1$ and $p_2$ and $q_2$ come from the same target or different targets. If the inequality does not hold, then the signal $h_1$ is also asserted to reject this signal pair. On the other hand, if the inequality is true, then processing continues with step F5. Step F5 calculates the quantity $K_1$ using the equation shown in FIG. 2. The right hand side of this equation is the fractional portion of the quantity x (computed at step F3) and the input parameters (from memory 2) $n_2$ and D. The final step as shown in FIG. 2 is a computation of the range d; at this point in the processing each parameter on the right side of the 3quation has been calculated. As shown in FIGS. 1 and 2, once the quantity d is calculated, it is input to the memory 5, as shown in FIG. 2. The signal $h_3$ is output by calculator 3, for reasons already explained.

The calculations done by circuit 4 are shown in FIG. 3. Only one test is done here and the pulse corresponding to a negative response is applied to a terminal 20, which is also connected to circuit 8 controlling switch 7. The true Doppler frequency $F_D$ at the output of circuit 4 is defined by the two numbers a and b such that $a < F_D < b$. Evidently, the length of the interval fixed by numbers a and b depends on the value of $\alpha$ determining the pass-band of the frequency filters. More particularly, the processing shown in FIG. 3, performed by the calculating circuit 4, includes steps F7–F17. As shown in FIG. 3, step F7 calculates a quantity A. The input parameters necessary for this calculation, N, D, $q_2$, $\alpha$, $n_1$ and $n_2$, are all provided by the memory 2. Function F8 calculates the parameter $\pi'$ which is the sum of unity and the integral portion of the quantity A calculated in step F7. Function F9 determines whether or not the inequality shown in FIG. 3 is true. If the test effected at function F9 is not passed, then as a result the signal $h_2$ is produced to reject this signal pair. On the other hand, if the test is passed, then quantity y is calculated in accordance with the expression of function F10; it should be noted that all the input parameters $\alpha_1$, $\pi'$, D and $n_2$ are all available from memory 2 or previously have been computed. Function F11 then tests the inequality shown in FIG. 3. The left side of this inequality is the fractional portion of the quantity y calculated at step F10. If this inequality holds, processing continues at step F15 to form the quantity l which is one more than the integer portion of the quantity y calculated at step F10. If the inequality does not hold then the inequality of function F12 is calculated. If the inequality is true, function F14 is performed to assign as the quantity l the integer portion of the quantity y calculated at step F10. If this inequality does not hold then function F13 is performed to increment the parameter $\pi'$ and function F9 is again performed. In effect functions F9–F13 performed in the manner indicated check the inequality $1 - D[\tau \Delta F - \alpha/Nn_1] \leq \alpha_2 m'D/n_1 \leq 1 + D[\tau \cdot \Delta - F - \alpha/Nn_1]$. Either the test is passed and the quantity l is calculated such that the test is satisfied or the test is not passed and the signal pair is rejected and at the same time the signal $h_2$ is produced.

Assuming the test had been passed then function F16 is performed to calculate the parameters $j_1$ and $j_2$. It should be noted that by the time function F16 is performed each of the parameters on which $j_1$ and $j_2$ are based has already been calculated or is available from the memory 2. Having calculated $j_1$ and $j_2$, then function F17 calculates the quantities a and b based on constants and previously computed values. The quantities a and b are such that the true Doppler frequency $f_D$ lies between them. If the test of function F9 is passed then the output quantities a and b are calculated by function F17. The control signal $h_4$ is output by the calculator 4 to the AND gate 40. As already described, if the signal $h_4$ and $h_3$ are produced for the same signal pair, gate 40 and memory 5 are enabled and an output is produced on the line 21 which performs the following functions. The quantities calculated in the circuits 3 and 4 (d, a and b) are transferred to the memory 5, the contents of the memory 5 are gated to the memory 6 and the OR gate 8 is satisfied to produce a new clock pulse to begin calculation on the next signal pair.

In summary the calculating circuit of FIG. 2 (circuit 3) provides two tests to determine if the signal pairs are derived from the same target (functions F2 and F4). If either test is failed then the signal pair information is rejected (by producing the signal $h_1$). On the other hand, if the tests are passed, then the range d is calculated and the signal $h_3$ is input to the gate 40 to validate the calculation. The calculating circuit of FIG. 3 (calculating circuit 4) performs a single test on information provided by the signal pair (function F9). If the test is failed then signal $h_2$ is produced to reject the signal pair. If the test is passed, the quantities a and b are calculated to determine the Doppler frequency $F_D$ and the control signal $h_4$ is produced to validate this output and input to the gate 40.

A device for processing echo signals for Doppler radars has been described which makes it possible to remove completely the ambiguity over range and speed due to the repetition frequencies.

What is claimed is:

1. A device for removing the range and speed ambiguities at the output of a Doppler-type radar transmitting pulses at first and second repetition frequencies $fr_1$ and $fr_2$, receiving echo signals from targets and applying the echo signals to a plurality of frequency filters comprising:

first memory means for storing in succession sets of two pairs of signals $(p_1, q_1)$ and $(p_2, q_2)$ corresponding to echoes at said different repetition frequencies $fr_1$ and $fr_2$ respectively, where $p_1$ and $p_2$ represent with respect to the latest transmitted pulse the number of the range quantum $\tau$ from which an echo signal is received and $q_1$ and $q_2$ represent the number of the filter at the output of which an echo signal is maximum and supplying at an output successively pairs of signals $(p_1, q_1)$ and $(p_2, q_2)$ in response to a succession of clock signals;

second memory means for storing radar data including said repetition frequencies $fr_1$ and $fr_2$, the Doppler frequency limits F1 and F2 and the maximum radar range $D_0$;

first calculating means for receiving said signals $p_1$ and $p_2$ from said first memory means and said radar data from said second memory means, and for testing to determine if said signals $p_1$ and $p_2$ come from the same target to produce a first signal when said signals do not and a second signal when they do, and in the latter event calculating a distance d to the target;

second calculating means for receiving said signals $q_1$ and $q_2$ from said first memory means and said radar data from said second memory means, and for testing to determine if said signals $q_1$ and $q_2$ come from the same target to produce a third signal when they do not and a fourth signal when they do and in the latter event calculating an interval encompassing the true Doppler frequency $F_D$;

means for transferring said calculated distance d and said calculated interval encompassing the true Doppler frequency $F_D$ to an output device if said second and fourth signals are produced, and alternatively not transferring said calculated information to said output device if either of said second and fourth signals are not produced.

2. The apparatus of claim 1 wherein:
said output device comprises an output memory with at least one output terminal at which contents of said output memory are available; and
said means for transferring includes a logic gate responsive to said second and fourth signals for gating said calculated information to said output memory.

3. The device of claim 2 wherein said first calculating means includes means for testing if a difference $p_2 - p_1$ is divisible by D to produce an integer quotient $\mu$, producing said second signal only if said test is satisfied, and means for testing if the fractional part of:

$$\frac{\alpha_1(p_2 - p_1)}{n_2} > \frac{D\left(\frac{T_0}{\tau} - p_1\right)}{n_1 n_2},$$

and for producing said second signal only if it is; where
$n_1 = 1/fr_1\tau$,
$n_2 = 1/fr_2\tau$,
$n_1$ and $n_2$ are integers with the highest common divider D such that:

$\alpha_1 n_1 + \alpha_2 n_2 = D$ and $T_0 = D_0/C$.

4. The device of claim 2 in which said first calculating means includes means for calculating d, the range of the target, such that:

$$d = p_1 + n_1 n_2 [\alpha_1(p_2-p_1)/n_2 - E(\alpha_1(p_2-p_1)/n_2)]/D$$

wherein $E(\gamma)$ represents the integral portion of $\gamma$ and $n_1 = 1/fr_1\tau$, $n_2 = 1/fr_2\tau$, $n_1$ and $n_2$ are integers with D a highest common divisor such that:

$\alpha_1 n_1 + \alpha_2 n_2 = D$.

5. The device of claim 2 in which said second calculating means includes means for testing all integers $\pi'$, between A and $A + \alpha(n_1+n_2)/ND$,
wherein A represents $[(q_2-\alpha/2)n_1 - (q_1+\alpha/2)n_2]/ND$ to satisfy:

$$\frac{\alpha_1 \pi' D}{n_2} - E\left(\frac{\alpha_1 \pi' D}{n_2}\right) \geqq 1 - D(\tau F2 - (q_2 - \alpha/2)/Nn_2)$$

$$\frac{\alpha_1 \pi' D}{n_2} - E\left(\frac{\alpha_1 \pi' D}{n_2}\right) \leqq D(\tau F1 + (q_2 + \alpha/2)/Nn_2)$$

wherein $E(\gamma)$ represents the integral portion of $\gamma$, $n_1 = 1/fr_1\tau$, $n_2 = 1/fr_2\tau$, $\tau$ is a duration of a range quantum, N is the number of frequency filters, D is the highest common divisor of $n_1$ and $n_2$, $\alpha$ is an integer greater than 1 defining a pass band for said filters by $\pm(\alpha/2)(fr_i/N)$, and $\alpha_1$ and $\alpha_2$ are coefficients satisfying $\alpha_1 n_1 + \alpha_2 n_2 = D$.

6. The device of claim 1 wherein said second calculating means includes means for calculating a range defined by a, b encompassing a Doppler frequency $F_D$ as:

$a = 1/\tau(\text{MAX}[j_1 + (q_1 - \alpha/2)/N)/n_1;$
$(j_2 + (q_2 - \alpha/2)/N)/n_2])$ $b = 1/\tau(\text{MIN}[j_1 + (q_1 + \alpha/2)/N)/n_1;$
$(j_2 + (q_2 + \alpha/2)/N)/n_2])$ where $\tau$ is the duration of a range quantum, $n_1 = 1/fr_1\tau$, $n_2 = 1/fr_2\tau$, $\alpha$ is an integer greater than one related to the passband of said frequency filters by $\pm(\alpha/2)(fr_i/N)$, N is the number of said filters,
$j_1 = (D - \alpha_1 n_1)/\alpha_1 D)(y) + n_1 l/D$ $j_2 = n_2(1-y)/D$ $l$ is an integer, $y = \alpha_1 \pi D/n_2$ and $\pi' = 1 + E(A)$ where:

$A = [q_2 - \alpha/2)n_1 - (q_1 + \alpha/2)n_2]/ND$ and MAX[G; H] is G if G>H, otherwise it is H, MIN[G; H] is G if G<H, otherwise it is H, and E(A) is the integral portion of A.

7. A method of removing range and speed ambiguities at the output of a Doppler type radar transmitting pulses at first and second repetition frequencies $fr_1$ and $fr_2$, receiving echo signals from targets and applying the echo signals to a plurality of frequency filters comprising:

storing in succession sets of two pairs of signals $(p_1, q_1)$ and $p_2, q_2)$ corresponding to echoes at said different repetition frequencies, respectively, where $p_1$ and $p_2$ represent with respect to the latest transmitted pulse the number of the range quantum $\tau$ from which an echo signal is received and $q_1$ and $q_2$ represent the number of the filter at the output of which an echo signal is maximum, and supplying successively pairs of signals $(p_1, q_1)$ and $p_2, q_2)$, storing in a second memory radar data including said repetition frequencies $fr_1$ and $fr_2$, the Doppler frequency limits F1 and F2 and the maximum radar range $D_0$, testing said signals $p_1$ and $p_2$ in conjunction with said radar data to determine if said signals $p_1$ and $p_2$ come from the same target to produce a first signal when they do not and a second signal when they do, and in the latter event calculating a true distance d to the target, testing said signals $q_1$ and $q_2$ to determine if they come from the same target to produce a third signal when they do not and a fourth signal when they do, and in the latter event calculating an interval encompassing the true Doppler frequency $F_D$, and transferring the calculated true distance d and said calculated interval encompassing the true Doppler frequency $F_D$ to an output device if said second and fourth signals are produced or alternatively, not transferring said calculated information to said output device if either of said second or fourth signals are not produced.

8. The method of claim 7 wherein the repetition frequencies used in the radar are selected so that the numbers $n_1 = 1/fr_1\tau$ and $n_2 = 1/fr_2\tau$, and a positive integer $m'$ is lower than $(n_1 + n_2)/ND$, where N is the number of frequency filters and D is the highest common divider of the integers $n_1$ and $n_2$, and satisfy the double inequality:

$$l - D[\tau \cdot \Delta F - \alpha/Nn_1] < \alpha_2(m'D/n_1) < l + D[\tau \cdot \Delta F - (\alpha/Nn_1)]$$

where l is an integer, $\Delta F$ is equal to the Doppler frequency range $|F2 - F1|$, $\alpha_1$ and $\alpha_2$ are numbers such that $\alpha_1 n_1 + \alpha_2 n_2 = D$, $\alpha$ is an integer greater than unity and related to the pass band of said frequency filters as $\pm(\alpha/2)(fr_i/N)$ and said data $n_1, n_2, \tau, D, \alpha_1, \alpha_2, F2$ and F1 are stored in the second memory.

9. The method of claim 8 wherein said step of testing signals $p_1$ and $p_2$ includes a first step determining if the difference between the $p_2$ and $p_1$ cannot be divided by D and a second test determining if the quantity $\alpha_1(p_2 - p_1)/n_2$, after subtraction of its integral portion, is greater than the quantity $D((To/\tau) - p_1)/n_1 n_2$.

10. The method of claim 8 wherein the step of calculating the distance d is calculated such that: $d = p_1 + n_1(n_2/D) (\alpha_1(p_2-p_1)/n_2) - E (\alpha_1/n_2)(p_2-p_1)$ in which $E(\sigma)$ represents an integral portion of $\sigma$.

11. The method of claim 8 wherein said step of testing signals $q_1$ and $q_2$ tests if an integer $\pi'$ between A and $A + \alpha(n_1 + n_2)/ND$ in which A represents the quantity $1/ND[(q_2 - \alpha/2)n_1 - (q_1 + \alpha/2)n_2]$ satisfies the following conditions:

$$y - E(y) \leq l - D(\tau F2 - (q_2 - \alpha/2)/Nn_2)$$

$$y - E(y) \leq D(\tau F1 + (q_2 + \alpha/2)/Nn_2$$

in which $y = (\alpha_1 \pi' D)/n_2$ and F1 and F2 represent the Doppler frequency limits which are acceptable with respect to the carrier wave center frequency.

* * * * *